United States Patent [19]
Sittig et al.

[11] 3,850,508
[45] Nov. 26, 1974

[54] METHOD AND APPARATUS FOR TESTING THE DOPING CONCENTRATION OF SEMICONDUCTORS

[75] Inventors: Roland Sittig; Wolfgang Zimmerman, both of Nussbaumen, Switzerland

[73] Assignee: Brown Boveri & Company Limited, Badin, Switzerland

[22] Filed: Nov. 14, 1972

[21] Appl. No.: 306,445

[30] Foreign Application Priority Data
Nov. 23, 1971 Switzerland.................. 16946/71

[52] U.S. Cl. .............................................. 356/209
[51] Int. Cl. .......................................... G01n 21/48
[58] Field of Search ........................... 356/209–212

[56] References Cited
OTHER PUBLICATIONS
Cardona et al., Physical Review, Vol. 154, No. 3, February 15, 1967 pp. 696–720.
Seraphin, Physical Review, Vol. 140, No. 5A, November 29, 1965, pp. 1716–1725.
Shaklee et al., Physical Review Letters, Vol. 15, No. 23, December 6, 1965, pp. 883–885.

Primary Examiner—Ronald L. Wibert
Assistant Examiner—F. L. Evans
Attorney, Agent, or Firm—Pierce, Scheffler & Parker

[57] ABSTRACT

An arrangement for testing the doping concentration existing below a surface of a semiconductor body having opposite parallel faces in which a beam of monochromatic light is directed against the face to be tested for reflection therefrom and an electric field is set up within the semiconductor body perpendicular to the opposite faces of the body. Relative movement is produced between the light beam and semiconductor body so that the light beam travels over the face being tested and the amount of the reflected light, which is measured, varies with and constitutes a measure of the doping concentration.

21 Claims, 5 Drawing Figures

METHOD AND APPARATUS FOR TESTING THE DOPING CONCENTRATION OF SEMICONDUCTORS

The present invention is directed to an improved method for testing the doping concentration of semiconductors as well as with a novel apparatus to accomplish this method in practice.

For the proper dimensioning and the manufacture of semiconductor components, especially components designed for high outputs and/or special uses, it is necessary to determine the doping concentration as precisely as possible. In order to check out properly the basic materials and to evaluate temperature processes, such as diffusion, expitaxy and the like which generate doping profiles, a testing of the doping, or of the resistivity respectively, together with its local fluctuations is therefore of utmost importance. This holds true particularly in case of steep, short-range profiles where, in addition to the lateral resolution, the resolution in depth will matter greatly.

Several methods for measuring or testing the above mentioned values are known. In addition to the four-point-method (ATM-sheet V 941-0 (00001964 or ASTM Designation F 84—68T), which can be called the standard measuring system and which is characterized by a sufficient precision but inferior local resolution (only a few mm), there are available other methods as listed below.

A metal point is forced into the surface of the semiconductor, and the spreading resistance around this point is measured (Journal Electrochemical Society 114, 255 (1967)). This method does attain sufficient local resolution (approx. $10 \times 10 \times 10$ $\mu m^3$) but the semiconductor surface will be destroyed. Furthermore, an accuracy of measurement in excess of 10 percent is attainable only by use of costly equipment.

Known high frequency capacitance measurements by means of a metal point sliding across the semiconductor surface (Solid State Electronics 13, 710 (1970) require a very precise construction but their accuracy will even under most favorable conditions not exceed the 10 percent range.

The also known infrared-absorption measurements (Applied Optics 9, 802 (1970) can be carried out with ease only in case of very high dopings (greater than $10^{18} \cdot cm^{-3}$), always however throughout the full thickness of the disk.

The principal object of the present invention is to provide a method for the testing of the doping concentration which is free of the disadvantages found in connection with the known methods, and which is distinguished by great precision and high local resolution. It is a further object of the invention to provide a novel apparatus for the practical application of the method proposed.

Figure 1:
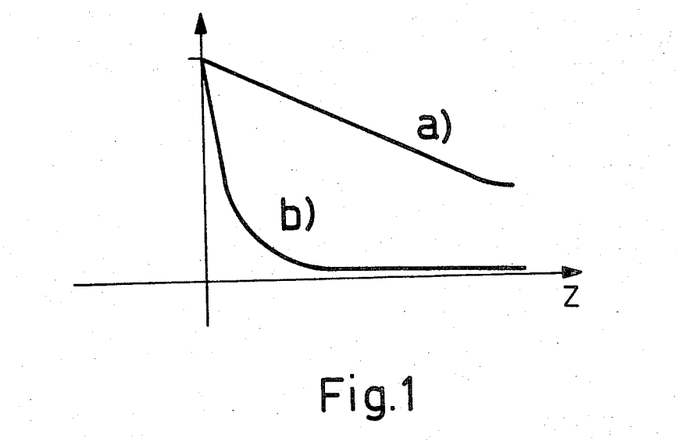
FIG. 1 shows a first set of graphs, depicting the interrelation between potential and doping.

The invention is based on the following reasoning: When an electric field is applied directly below a semiconductor surface, its capacity R for reflecting light of specific wavelengths will change. This effect is called electro-reflection (Solid State Physics Suppl. 11 "modulation Spectroscopy", 1969 Academic Press). In the case of silicon, for example, there occurs a change $\Delta R$ within the range of 350 – 390 nm. The penetration depth of this light is approximately 0.01 $\mu m$. The magnitude of the relative change in reflection $\Delta R/R$ depends on the field intensity just below the crystal surface. Between the field intensity and the doping concentration there exists a complicated but known interconnection. By applying a transparent, or at least partially transparent electrode, serving as an equipotential surface, to the semiconductor surface, and by applying an electric potential between this surface and the other semiconductor surface, the gradient of the potential (electric field intensity) will be functionally related to the locally existing doping concentration. This is illustrated in the form of an example by FIG. 1 of which Graph a depicts the potential curve in case of a low doping concentration, and graph b in the case of a high doping concentration. By illuminating only very small portions of the semiconductor surface and by measuring the reflection at these portions it becomes thus possible to determine the doping concentration from the local changes of the so-called electro-reflection signal.

Therefore, the method according to the invention which serves to solve the above discussed problem is characterized by the feature that the local doping concentration is determined by means of electro-reflection.

A preferred embodiment of the method proposed by the invention provides the illumination of the portion of the semiconductor surface to be tested by means of a preferably monochromatic light beam, the generation of an electric field within the semiconductor substantially perpendicular to the semiconductor surface, and the determination of the local changes of the reflection capacity.

Standard Xenon-lamps can be used as light sources, followed by a monochromator. Laser light sources are also well suitable, their advantage being that they already emit a monochromatic light so that there will be no need for monochromators. However, a suitable, intensive spectrum line can also be used as the light source. Additional features and species of the invention, and especially advantageous devices to carry out the method proposed by the invention are explained below in detail by use of practical examples illustrated by the accompanying drawings wherein:

Figure 2:
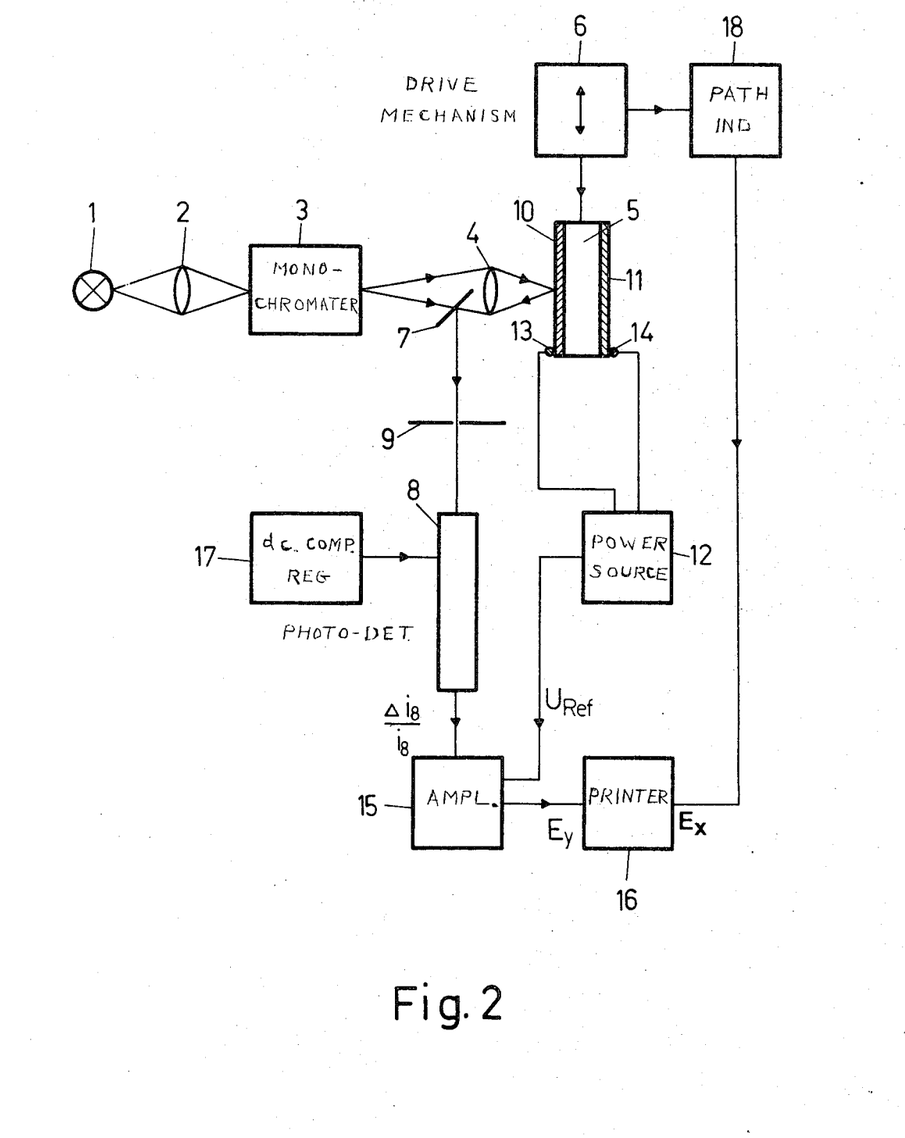
FIG. 2 shows a first embodiment of an apparatus to carry out in practice the method proposed by the invention.

The method proposed by the invention is described below by use of an apparatus, a species of which is illustrated by FIG. 2. A standard Xenon-lamp 1 or a preferably tuneable laser serves as a light source. A suitable spectrum line can also be employed as the light source. It is one of the specifications for such a light source that it delivers light of high intensity within the region of the spectrum where there exists the maximum of the electro-reflection, in the case of silicon for example, in the region from 350 nm to 390 nm. The light beam, emerging from the light source and passing through a first forming system, for example, a lens 2, arrives at a monochromator 3. When a laser beam is used, the monochromator 3 can be omitted, and when a spectrum line is employed, the monochromator can be replaced by a suitable filter. After leaving the monochromator the light beam is focussed at the area of a semiconductor to be tested, in the case of the example illustrated the frontal area of a semiconductor disk 5, by means of a second forming system, for example, a microscope objective lens 4 which at the greatest possible aperture angle for the incident light still permits a sufficient reduction of the spot. The optical axis of the objective lens 4 and the frontal area of the semiconductor disk 5 should comprise in this connection an angle of approximately 90°. By means of a driving mechanism 6, not illustrated in detail, the semiconductor disk 5 can be moved within the plane determined by its frontal area facing the lens 4.

The reflected light is guided by means of a mirror 7 to the light-sensitive layer of a detector represented by photo-multiplier 8. It will be expedient to utilize only one half of the lens 4 by means of a shutter and to arrange the mirror 7 within the region of the nonilluminated area. A more simple arrangement, however, as shown by FIG. 2, is the simultaneous use of the mirror as a shutter. In order to screen out any external light, an additional shutter 9 can be arranged in front of the optical system of the photo-detector 8.

The semiconductor disk 5 is provided at its frontal area facing the lens 4 with an electrically conducting and transparent electrode 10, consisting preferably of tindioxide ($SnO_2$) with a thickness of between 0.05 $\mu$m and 0.5 $\mu$m, preferably approximately 0.1 $\mu$m. Tindioxide electrodes can be prepared in a simple manner by using a known method (Published German application Pat. No. 1 185 151), and can also be removed with ease, for example, with hydrochloric acid and zinc, without impairing the semiconductor.

The other frontal area is provided with a contact layer 11, such as conductive silver. Obviously, this contact layer can be omitted if a semiconductor disk is to be tested which is already provided with such contact.

The electrode 10, and the contact layer 11 respectively are provided with connecting electrodes 13, and 14 respectively, to facilitate the junction with power source 12 which will generate the potential gradient within the semiconductor. Power source 12 supplies an alternating voltage, preferably in the form of a square-wave voltage (for example amplitude 1 volt, frequency 100 to 500 Hz, keying ratio approx. 1 :1). The effective value of this square-wave voltage should be approximately half as large as its amplitude. However, a sinusoidal alternating voltage with, for example, 5 $V_{ss}$ and a d.c. component greater than half of the peak-to-peak value can also be utilized. These specifications are established to avoid an excessive current flow within the semiconductor. The transition zone tindioxide/semiconductor forms a rectifying transition which is biased in inverse direction by the selection of these specific effective values of the alternating voltages.

The output signal of the photo-multiplier 8 is transmitted to a phase-responsive amplifier (Lockin-amplifier) 15. This amplifier obtains its reference voltage from the power source 12. A printer 16 is connected with the output of the amplifier 15.

The method of operation of the above described apparatus is as follows:

Assuming constant intensity and wave length of the light striking the semiconductor disk 5, there will occur different intensities of the light reflected there if, at the point of reflection and just below the crystal surface, different field intensities arise. If the semiconductor disk 5 is not moved, the reflected light is modulated in phase with the field-generating alternating voltage. Assuming an ideal photo-detector 8, then its relative output current change $\Delta i_8/i_8$ will be proportional to the relative change in the reflection capacity $\Delta R/R$. At the output end of the phase-responsive amplifier 15 there is thus generated a voltage which will be constant under ideal conditions, and which represents a measurement for the doping concentration within the area of the spot of light incident at the semiconductor disk. This voltage can be recorded by the printer 16.

Now, if the semiconductor disk 5 is moved relative to the illuminating spot, for example, perpendicularly to it, the output signal of the photo-detector 8 will not change if the doping concentration remains constant. However, local fluctuations of the doping concentration will cause a change in this output signal, and doping changes can thus be determined.

Absolute values for the doping concentrations or for the local fluctuations can be furnished if the entire system is standardized, for example, by use of semiconductors with known dopings and/or doping profiles. Obviously, it is also feasible to determine the doping at characteristic points of the semiconductor disk by means of a known method, and to compare it with the doping value obtained by use of the method proposed by the invention.

There is another, but by far more costly, alternative, namely to compute the interrelation between doping concentration and output voltage of the amplifier 15. In this case it is possible to calibrate the indicating or recording device, connected with and following the amplifier 15, directly in units of doping. This last-mentioned alternative is certainly of great interest for scientific research, but for practical usage it will be sufficient if the magnitude of the local doping fluctuations is determined in approximation so that the initially mentioned method of calibration should be satisfactory.

As stated above, the relative output current change $\Delta i_8/i_8$ is proportional to the relative change in the reflection capacity $\Delta R/R$. In order to arrive at $\Delta R/R$, it would be normally necessary to establish the quotient $\Delta i_8/i_8$ in order to correct for the intensity of the incident light, namely, for the following reasons:

The output signal of the photo-detector, for example, of a photo-multiplier, can be broken up into a d.c. and an a.c. component: $i_8 = I_oR$ is the d.c. component, and $\Delta i_8 = I_o\Delta R$ is the a.c. component. By forming the quotient $\Delta i_8/i_8 = I_o\Delta R/I_oR$, the intensity $I_o$ of the incident light is eliminated. However, the forming of this quotient leads to a great difficulty: The measurement of the d.c. component $i_8$ must be very precise, and this holds true also for the a.c. component $\Delta i_8$. Furthermore, $i_8$ is usually greater than $\Delta i_8$ by orders of magnitude. Both values must then be entered in an analog or digital computer to obtain the quotient. These difficulties can be avoided if the high voltage supply of the photo multiplier 8 is provided with a regulating device 17 which keeps the d.c. component of the signal, leaving the photo-multiplier, at a constant value. The design and the method of operation of this regulator are not explained here in detail because a known device can be used for this purpose, as described, for example, in the book "Solid State Physics, Suppl. 11, Modulation Spectroscopy", 1969 Academic Press, pages 99 to 102, and especially figures 46 and 47.

The recovery time constant of this regulator 17 must be substantially greater than the periodic time of the a.c. component $\Delta i_8$ of the photo-multiplier output signal. It is further necessary to keep the integration time of the phase-responsive amplifier 15 in alignment with the speed of the semiconductor disk 5, moving under the illuminating spot, so that local doping fluctuations can be recognized as such. As an example, within the above given frequency range of the modulation signal, furnished by the power source 12, and an integration time of the amplifier 15, advance of less than $3.10^{-3}$ cm/sec and an illuminating spot width of approximately 50 $\mu$m was found to be appropriate. In case of certain tests, it can also be useful to employ in place of a linear advance a revolving disk for moving the semiconductor. It becomes thus possible to test circular areas of the semiconductor surface. In this case it is necessary to align the speed of the illuminating spot, passing over the semiconductor disk, in accordance with the above given parameters.

In order to obtain an unmistakable interconnection between the established doping value and the specific location of this doping, it will be advantageous to employ an XY-printer, it Y-input $E_Y$ being connected with the output of the phase-responsive amplifier 15, and its X-input $E_X$ with a path-indicator 18, actuated by the driving mechanism 6. This path-indicator can be designed in such manner that it delivers an output voltage, its amplitude being proportional to the path traveled by the semiconductor disk 5.

Figure 4:
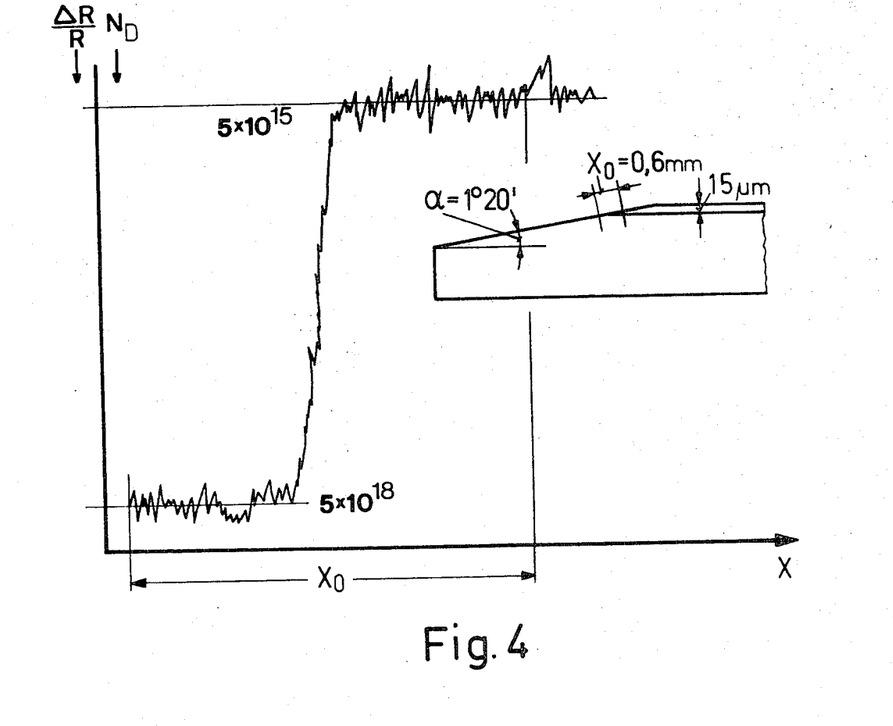
FIG. 4 shows a second graph, depicting the doping profile of an expitaxy layer.

FIG. 4 depicts graphically the doping profile of an expitaxy layer. At the Y-coordinate there is plotted the relative change of the reflection capacity $\Delta R/R$ or the doping $N_D$ (a toms/cm$^3$) respectively, and at the X-coordinate there is plotted a place co-ordinate. This profile was recorded in accordance with the invention based on the following parameters:

Light with a wavelength of 374 nm, modulation signal of 180 Hertz, amplitude 1 volt, keying ratio 1 : 1, illuminating spot diameter 35 $\mu$m, advance speed 2 $\mu$m/sec., substrate: Sb-doped Si with 0.01 ohm·cm, 15 $\mu$m thick phosphor-doped expitaxy layer with 0.99 ohm·cm.

The above described method has the following advantageous characteristics:

The place resolution is determined by the size of the illuminating spot, and is limited in principle only by diffraction effects. It can be kept exceedingly small, down to a few $\mu$m, so that it will be sufficient for practical as well as for scientific purposes. The resolution in depth is only approximately 0.01 $\mu$m due to the low penetration depth of the light.

With the exception of the placement of the electrodes, the method operates without physical contact so that measurements can be taken without any damage to the surface of the semiconductors.

By increasing the integration time of the electronic measuring system within certain limitations, precision can be improved correspondingly.

The measuring system can be automated in a simple manner, and the method proposed by the invention is therefore particularly suitable for the testing of large surfaces.

In view of the low penetration depth of the light, the method of the invention is particularly well suited for the testing of doping concentrations at tapered semiconductor components. Here, the superiority of the new method over the metal-point method becomes particularly apparent because in the case of the latter, the point might penetrate the entire layer when placed in position.

Figure 3:
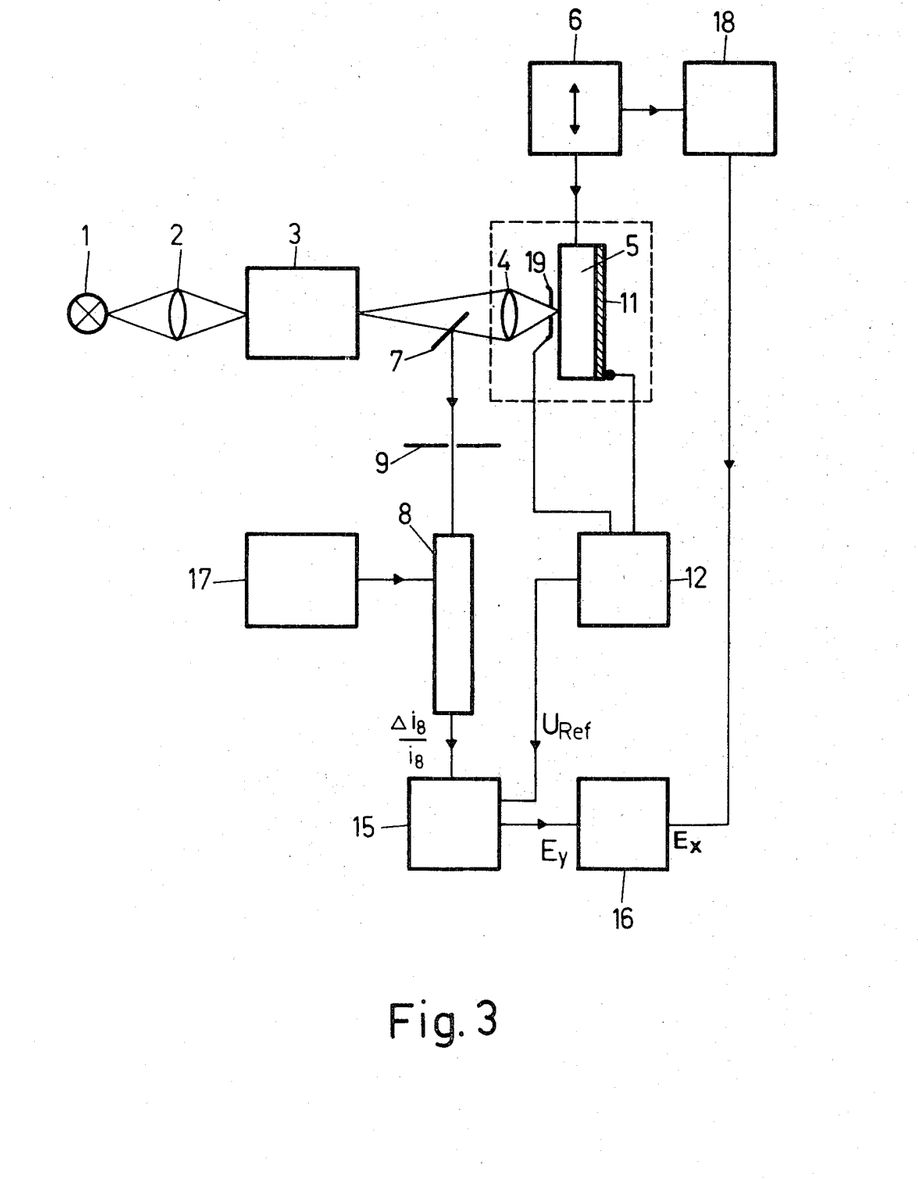
FIG. 3 shows a second embodiment of an apparatus to carry out in practice the method proposed by the invention.

FIG. 3 shows a second species of an apparatus to carry out in practice the method of the invention. This apparatus differs from the system shown by FIG. 2 primarily by a metallic pinhole diaphragm 19 which replaces the layer of tindioxide. Furthermore, the portion of the apparatus, indicated in FIG. 3 by broken lines, must be placed under vacuum. The pinhole diaphragm has an aperture of approximately 50 $\mu$m, and its distance to the semiconductor surface is approximately 100 $\mu$m. The amplitude of the alternating voltage, applied between pinhole diaphragm 19 and semiconductor 5, is in the order of 1,000 volt magnitude so that sufficiently high field intensities will be generated within the semiconductor. Similar to the first example, a square-wave voltage or a sinusoidal alternating voltage can be used as the alternating voltage. In this case there are no limitations as to polarity and d.c. component, because there is no rectifying transition between electrode (pinhole diaphragm 19) and semiconductor surface.

In the case of this specific arrangement, a constant distance between pinhole diaphragm 19 and the semiconductor surface must be kept, and this distance is critical because any changes, with the voltage applied, will show up directly as changes in field intensity. However, any changes in distance between pinhole diaphragm and semiconductor surface in the form of capacitance change can be easily determined, with pinhole diaphragm and semiconductor forming a capacitance indicator, and can thus become components of a distance-control device actuated in accordance with a change in capacity to maintain a constant distance, such device being part of the present state of art.

Obviously, it is also possible to use in place of a pinhole diaphragm a sieve-shaped electrode, or an electrode formed by multitude of wires, stretched in parallel, because the electrode has the task of allowing passage of light, and to generate within the area of measurement a field of sufficient strength.

In contrast to the species shown by FIG. 2, this apparatus operates without any physical contact at all, with no need to place a transparent electrode at the semiconductor. Furthermore, one is not constrained by the blocking characteristics of the heterogeneous transition tindioxide/silicon. It becomes now possible to select the field-generating alternating voltage, especially with respect to its d.c. component, in such manner that the signal-to-noise ratio at the photo-multiplier output is made as high as possible. However, the equipment being used is more extensive than in case of the first species discussed.

The testing of the doping concentration, and with it the testing of the resistivity by way of the local resolution, made feasible by the invention, meets an urgent requirement of the crystal producers as well as the crystal users. In addition to improving the quality control of the semiconductor material, the invention teaches a simple method to detect local irregularities in diffusion profiles. Due to the low penetration depth of the light it becomes now possible to test very short-range doping profiles, used primarily in the IC-technology.

Figure 5:
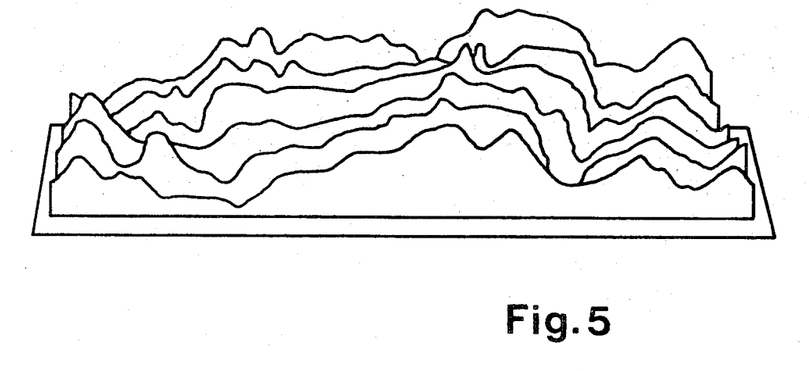
FIG. 5 shows a third graphic, depicting the two-dimensional doping profile of a semiconductor disk in perspective.

The portion of a two-dimensional doping profile of a semiconductor disk, shown by FIG. 5, gives an idea of the potential scope of the invention. This profile was obtained in that by means of the apparatus illustrated by FIG. 2 the doping profiles of parallel strips of the semiconductor frontal area were recorded successively. The printed graphs, so obtained, were then arranged side-by-side true to scale. After these tests, conventional measurements were then carried out which conformed well with the results of the apparatus according to the invention.

We claim:

1. The method of testing the doping concentration existing below the surface of a semiconductor body which comprises the steps of:
   illuminating a surface portion of the semiconductor body by means of a beam of monochromatic light,
   generating an electric field within the semiconductor body which has a direction substantially perpendicular to the surface being tested,
   effecting relative movement between the semiconductor body and the incident light beam in a direction perpendicular to the beam,
   detecting the monochromatic light reflected from correspondingly different surface portions of the semiconductor body, and
   measuring the corresponding variations produced in the amount of the light reflected from the different surface portions of the semiconductor body, said variations in the reflected light being indicative respectively of the doping concentrations existing below the different surface portions of the semiconductor body.

2. The method of testing the doping concentration below the surface of a semiconductor body as defined in claim 1 and which includes the further step of storing the value of the reflected light together with the coordinate of said relative movement between said light beam and semiconductor body.

3. Apparatus for testing the doping concentration below the surface of a semiconductor body having opposite parallel faces which comprises:
   means for producing and directing a beam of monochromatic light against a portion of the surface of one face of the semiconductor body to be tested for reflection therefrom,
   means including electrode means applied at the opposite faces of the semiconductor body and a source of alternating voltage for producing an electric field within the semiconductor body perpendicular to the face to be tested,
   means for effecting relative movement between the semiconductor body and the incident light beam in a direction perpendicular to the beam,
   detector means for detecting the monochromatic light reflected from correspondingly different surface portions of the semiconductor body, and
   means for measuring the output from the detector means and which is indicative of the doping concentration existing below the different surface portions of the semiconductor body.

4. Apparatus for testing the doping concentration below the surface of a semiconductor body as defined in claim 3 wherein said electrode means includes a transparent conductive layer applied to the face of the semiconductor body receiving the light beam for reflection therefrom and a conductive contact layer applied to the opposite face.

5. Apparatus for testing the doping concentration below the surface of a semiconductor body as defined in claim 4 wherein said transparent conductive layer is constituted by a layer of tindioxide having a thickness between 0.05 $\mu$m and 0.5 $\mu$m and preferably about 0.1 $\mu$m.

6. Apparatus for testing the doping concentration below the surface of a semiconductor body as defined in claim 3 wherein said electrode means includes an at least partially transparent conductive electrode member arranged adjacent to but spaced from the face of the semiconductor body receiving the light beam for reflection therefrom and a conductive contact layer applied to the opposite face.

7. Apparatus for testing the doping concentration below the surface of a semiconductor body as defined in claim 6 and wherein the space between said at least partially transparent conductive electrode member and the face of the semiconductor body is evacuated.

8. Apparatus for testing the doping concentration below the surface of a semiconductor body as defined in claim 7 wherein said at least partially transparent conductive electrode member and the face of the semiconductor body receiving the light beam for reflection therefrom is located within an evacuated chamber.

9. Apparatus for testing the doping concentration below the surface of a semiconductor body as defined in claim 6 wherein said at least partially transparent conductive electrode member is constituted by a pin hole diaphragm.

10. Apparatus for testing the doping concentration below the surface of a semiconductor body as defined in claim 9 wherein the diameter of the pin hole in said diaphragm lies between 30 $\mu$m and 170 $\mu$m.

11. Apparatus for testing the doping concentration below the surface of a semiconductor body as defined in claim 6 wherein said at least partially transparent conductive electrode member is constituted by at least one set of parallel spaced wires.

12. Apparatus for testing the doping concentration below the surface of a semiconductor body as defined in claim 6 wherein said at least partially transparent conductive electrode member is constituted by a wire grid.

13. Apparatus for testing the doping concentration below the surface of a semiconductor body as defined in claim 3 wherein said detector means for measuring the amount of the light reflected from the face of the semiconductor body comprises a photomultiplier.

14. Apparatus for testing the doping concentration below the surface of a semiconductor body as defined in claim 13 and which further includes means connected to said photomultiplier for regulating the direct current component of the output therefrom to a constant value.

15. Apparatus for testing the doping concentration below the surface of a semiconductor body as defined in claim 13 and which includes a phase-responsive amplifier connected to the output of said photomultiplier for intensifying the alternating current component thereof, said phase-responsive amplifier being provided with a reference signal obtained from said source of alternating voltage which produces the electric field within the semiconductor body.

16. Apparatus for testing the doping concentration below the surface of a semiconductor body as defined in claim 15 and which further includes a recording device connected to the output of said phase-responsive amplifier.

17. Apparatus for testing the doping concentration below the surface of a semiconductor body as defined in claim 15 and which further includes a recording device in the form of an XY coordinate printer, one of said coordinates being controlled by the output from said phase-responsive amplifier, means for driving said semiconductor body along a path perpendicular to the incident light falling on the face of the semiconductor body being tested, and a path indicator connected to said driving means and which serves to control the other coordinate of said printer.

18. Apparatus for testing the doping concentration existing below the surface of a semiconductor body as defined in claim 3 wherein said means for producing said monochromatic light beam comprises an xenon lamp followed by a monochromator.

19. Apparatus for testing the doping concentration existing below the surface of a semiconductor body as defined in claim 3 wherein said means for producing said monochromatic light beam comprises a spectrum line.

20. Apparatus for testing the doping concentration existing below the surface of a semiconductor body as defined in claim 3 wherein said means for producing said monochromatic light beam comprises a laser and which is preferably tunable.

21. Apparatus for testing the doping concentration existing below the surface of a semiconductor body as defined in claim 3 wherein said source of alternating voltage utilized for producing said electric field within the semiconductor body operates at frequency of from 100 to 500 Hz.

* * * * *

UNITED STATES PATENT OFFICE
CERTIFICATE OF CORRECTION

Patent No. 3,850,508          Dated Nov. 26, 1974

Inventor(s) ROLAND SITTIG, WOLFGANG ZIMMERMAN

It is certified that error appears in the above-identified patent and that said Letters Patent are hereby corrected as shown below:

[73] Assignee:     BBC BROWN BOVERI & COMPANY LIMITED
                   Baden, Switzerland Signed and sealed this 11th day of February 1975.

(SEAL)
Attest:

RUTH C. MASON                C. MARSHALL DANN
Attesting Officer            Commissioner of Patents
                             and Trademarks